A. B., CRUICKSHANK.
HEAT DISTRIBUTER FOR COOKING UTENSILS.
APPLICATION FILED JUNE 18, 1913.
1,109,323.
Patented Sept. 1, 1914.
2 SHEETS—SHEET 1.
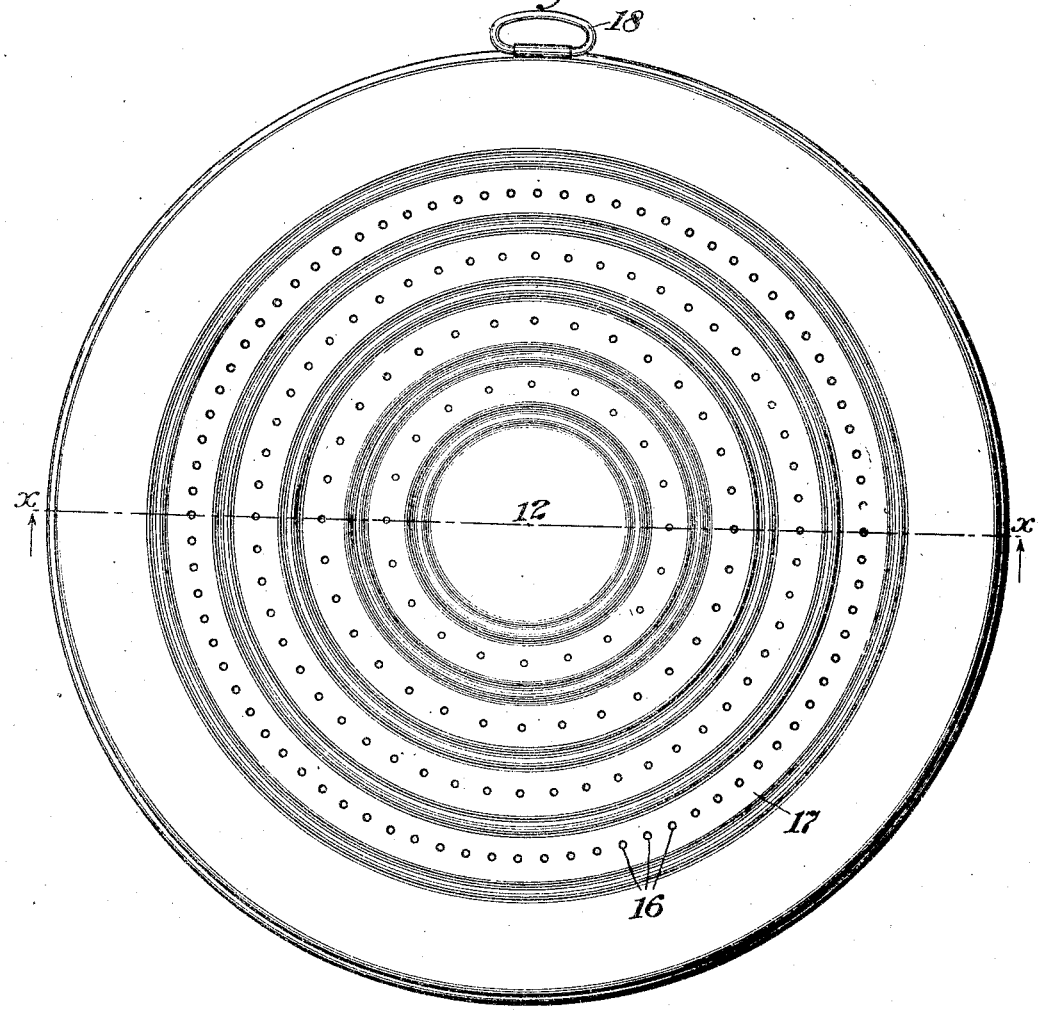
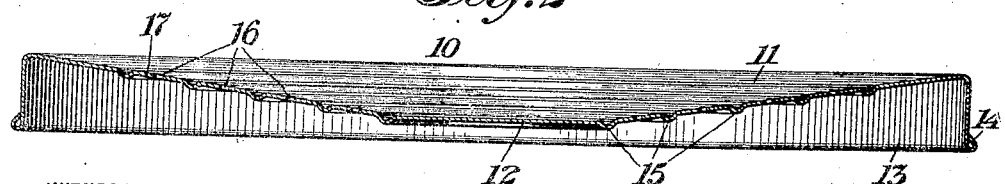
WITNESSES
Chas. F. Clagett
Bertha M. Allen
INVENTOR
Arthur B. Cruickshank
BY
HIS ATTORNEYS A. B. CRUICKSHANK.
HEAT DISTRIBUTER FOR COOKING UTENSILS.
APPLICATION FILED JUNE 18, 1913.
1,109,323.
Patented Sept. 1, 1914.
2 SHEETS—SHEET 2.
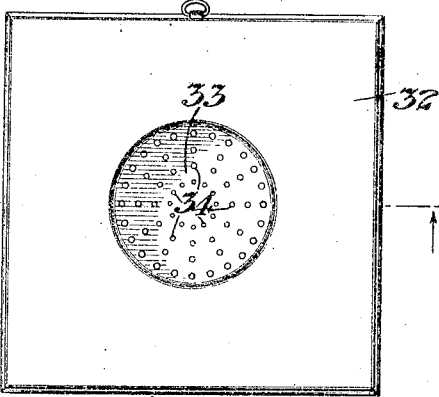
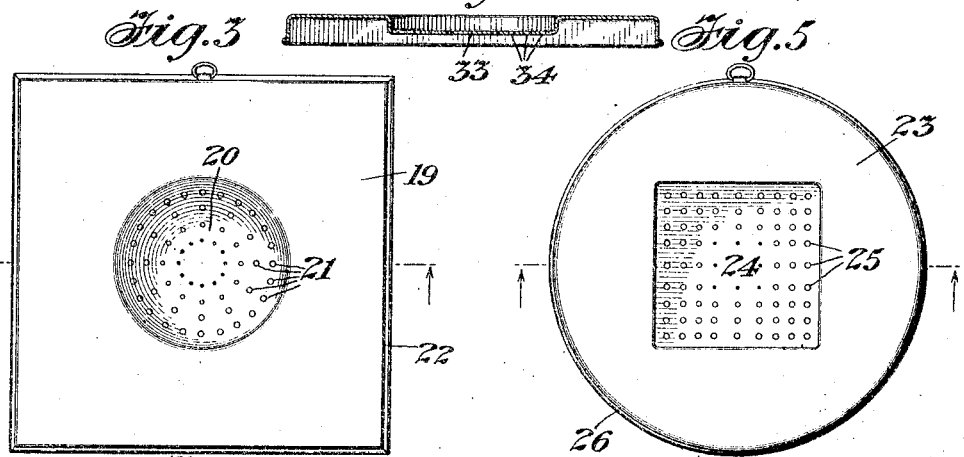
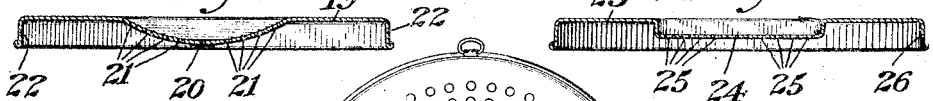
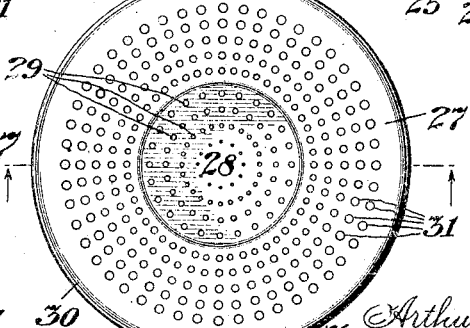
WITNESSES
Chas. F. Clagett
Bertha M. Allen
INVENTOR,
Arthur B. Cruickshank
BY
HIS ATTORNEYS.

UNITED STATES PATENT OFFICE.

ARTHUR B. CRUICKSHANK, OF LONDON, ENGLAND.

HEAT-DISTRIBUTER FOR COOKING UTENSILS.

1,109,323.　　　　　Specification of Letters Patent.　　Patented Sept. 1, 1914.

Application filed June 18, 1913.　Serial No. 774,319.

*To all whom it may concern:*

Be it known that I, ARTHUR B. CRUICKSHANK, a subject of the King of Great Britain, residing at London, England, have invented an Improvement in Heat-Distributers for Cooking Utensils, of which the following is a specification.

My present invention relates to a heat distributer for cooking utensils and is adapted to effect an even distribution of heat from the gas flame over the under surface of a cooking utensil.

The device of my present invention is what may be termed a single plate heat distributer, in contra-distinction to heat distributers in which a plurality of plates are employed. Such a single plate heat distributer is shown and described in Letters Patent No. 928,634, granted to me on the 20th day of July, 1909, and while the device disclosed in this patent adequately answers the purposes for which it was intended, no special provision was made in it for retaining the heat, and consequently its use entailed an otherwise unnecessary consumption of gas.

The object of my present invention is therefore the provision of a single heat distributer which is so constructed as to evenly distribute the heat over the bottom of a cooking vessel and also to retain the heat so as to reduce the gas consumption to a minimum.

In carrying out my present invention, the heat distributer made in accordance therewith preferably comprises a single piece of sheet metal having a concave outer face and being provided with a depending rim upon the edge of which the distributer rests when in use. The distributer may obviously be provided with concentric ribs or corrugations for stiffening and strengthening the same and may also be provided with series of varied sized and spaced apertures for assisting in the distribution of the heat, as will be hereinafter more particularly described.

In the drawing, Figure 1 is a plan of my improved heat distributer, Fig. 2 is a cross section on line $x$ $x$, Fig. 1, Figs. 3 and 4, Figs. 5 and 6, Figs. 7 and 8, and Figs. 9 and 10 are, respectively, plans and central cross sections illustrating modified forms of the invention.

As will be seen by reference to the drawings, and particularly Fig. 1, my improved heat distributer is made from a single piece of sheet metal which is indicated at 10. The upper or outer face of the distributer is preferably concave, as indicated at 11, and at its periphery there is a depending flange or rim 13, the edge of which is preferably turned or rolled as indicated at 14, providing a surface upon which the device rests when in use. At the center, the heat distributer plate in this form is provided with a flat portion indicated at 12, although this may be curved as in Figs. 3 and 4, and between this portion 12 and the flange I prefer to provide a series of ribs or corrugations 15 for the purpose of strengthening or stiffening the plate. As indicated in the drawing these ribs or corrugations are circular and concentric, and may be spaced apart as desired.

In the annular portions 17 of the heat distributer plate, that is those portions between the circular ribs or corrugations, I prefer to employ series of apertures indicated at 16. These apertures preferably increase in diameter from the center toward the outer portion of the plate, and furthermore are more closely spaced as the distance from the center increases. That is to say, the apertures nearer the center of the plate are smaller than those nearer the outer portion of the plate, and the circular series of apertures in the innermost annular portion are spaced considerably farther apart than are those in the outermost annular portion.

It will be apparent from the foregoing that the tendency of the inner or under convex surfaces of the plate is to throw the heat from the gas burner toward the periphery of the plate, and that the depending flange tends to retain and distribute the heat evenly over this convex under surface. It will also be apparent that as the size and number of the apertures increase from the center outward that the greater amount of heat will be permitted to pass through the plate and be directed against the under surface of the cooking vessel as the distance from the center of the plate increases. It will furthermore be apparent that inasmuch as the upper or outer surface of the heat distributer plate is concave, there will be an air chamber between the under side of the cooking vessel and that portion of the heat distributer plate immediately beneath the same, irrespective of the size of the cooking vessel employed, and this air chamber affords a further means for retaining the heat and evenly distributing the same against the under surface of the cooking vessel. I may also employ a ring 18, suitably secured to the rim 13 and by which the distributer may be handled when in use and supported when not in use.

Referring to Figs. 3 and 4, it will be seen that the plate 19 may be square and provided with a central concave portion indicated at 20. This concave portion is provided with apertures 21, arranged in circular series and varying in sizes, the spaces between the apertures in each circular series increasing from the center toward the periphery of the concave portion 20, and also increasing in diameter as the distance from the center of the concave portion approaches the boundary thereof, and similarly to the preferred form of the invention, the plate 19 is provided with a peripheral rim or flange, indicated at 22, the width of which is greater than the maximum depression of the concave portion 20.

Referring to Figs. 5 and 6, it will be seen that I may make the plate member 23 circular in outline, and provide the same centrally with a well or depressed portion, indicated at 24, this depressed portion being provided with apertures 25, which are arranged in square series, increasing in diameter from the central series outwardly. The plate in this form of the invention is also provided with a rim 26, similarly to those forms of the invention hereinbefore described.

Referring to Figs. 7 and 8, the plate 27 may be circular in outline, provided centrally with a well 28, provided with apertures 29, those portions of the plate extending between the well 28 and the rim 30 being concave, as is plainly indicated in Fig. 8, and the concave portions of the plate may be provided with apertures 31. Both the apertures 29 and the apertures 31 are arranged in circular series and increase in diameter as the distance from the center increases, and are spaced more closely in the outer than in the inner series.

Referring to Figs. 9 and 10, the plate 32 may be square in outline and provided with a central circular well or depression 33, in which there are apertures 34 increasing in diameter as in the other forms of the invention, from the center of the well outwardly and also being more closely spaced in the outer than in the inner series.

I claim as my invention:

1. A heat distributer comprising a concavo convex plate of sheet metal provided with series of concentric corrugations and intermediate annular portions, the said annular portions being provided with series of apertures, the said apertures in the inner series being spaced at greater distances than the apertures in the outer series.

2. A heat distributer comprising a concavo convex plate of sheet metal provided with series of spaced apertures increasing in size and number from the innermost to the outermost series of apertures, and a depending rim connected to the said plate.

3. A heat distributer comprising a concavo convex plate of sheet metal provided with series of circularly arranged apertures, the apertures in the central series thereof being smaller and spaced at greater distances apart than the apertures in the outer series thereof, and a rim connected to and depending from the said plate.

4. A heat distributer comprising a concavo convex plate of sheet metal provided with series of concentric corrugations and intermediate annular portions, the said annular portions being provided with series of apertures, the apertures in the innermost annular portion being smaller and spaced at greater distances than the apertures in the outermost annular portion, and a depending rim connected with the said plate.

5. A heat distributer comprising a concavo convex plate of sheet metal, provided with series of spaced concentric corrugations and intermediate annular portions, the said annular portions being provided with a series of apertures, the apertures of the said series thereof gradually increasing in diameter from the innermost to the outermost series with the distance between the series of the said apertures gradually decreasing from the innermost to the outermost series thereof.

6. A heat distributer comprising a plate of sheet metal and a depending peripheral flange, the said plate having a concavo convex portion provided with series of perforations which are spaced closer to one another in the outer part of the plate than in the inner part thereof.

7. A heat distributer comprising a plate of sheet metal and a depending peripheral flange, the said plate having a concavo convex portion provided with series of perforations, the diameters of which are larger in the outer part of the plate than in the inner part thereof.

8. A heat distributer comprising a plate of sheet metal and a depending peripheral flange, the said plate being provided centrally with a well or depression, and also with a series of perforations which are more closely spaced and of larger diameter in the outer part of the plate than in the inner part thereof.

Signed by me this 4th day of June, 1913.

ARTHUR B. CRUICKSHANK.

Witnesses:
H. D. JAMESON,
O. J. WORTH.